April 1, 1952 — J. M. PESTARINI — 2,590,887
TRANSFORMER METADYNE
Filed Nov. 29, 1946 — 2 SHEETS—SHEET 1
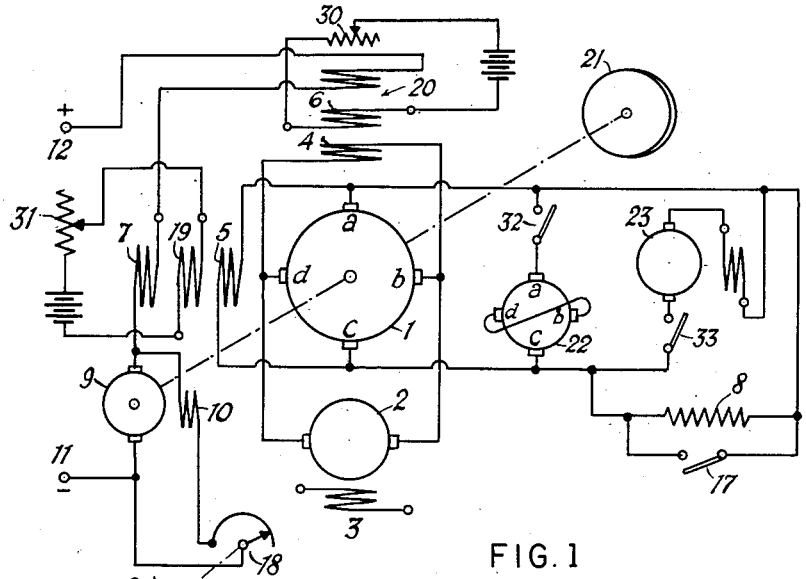
FIG. 1
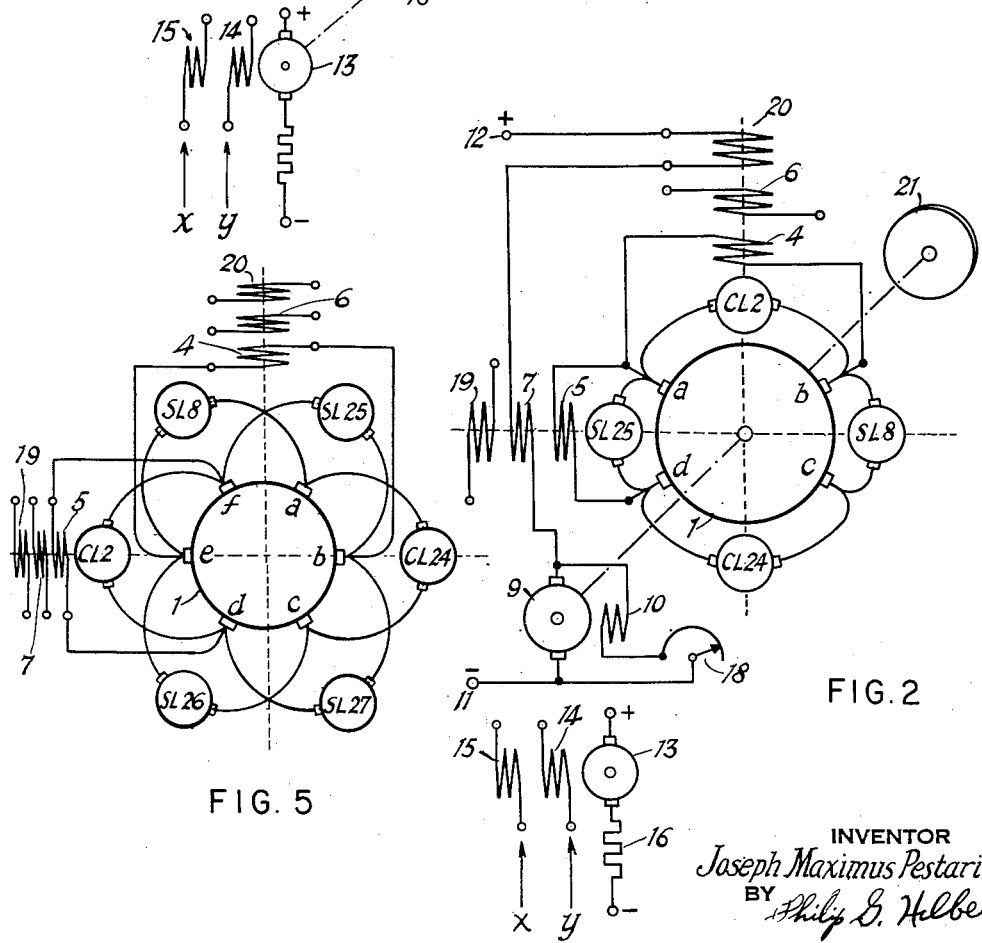
FIG. 5
FIG. 2
INVENTOR
Joseph Maximus Pestarini
BY Philip G. Hilbert
ATTORNEY April 1, 1952     J. M. PESTARINI     2,590,887
TRANSFORMER METADYNE
Filed Nov. 29, 1946     2 SHEETS—SHEET 2
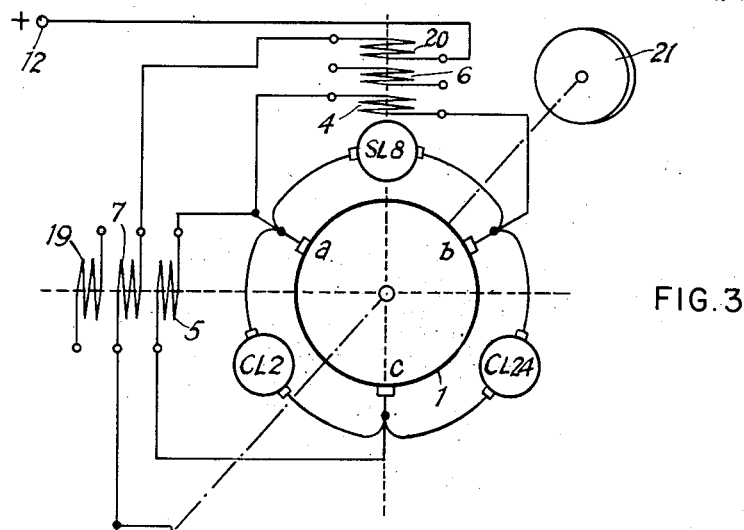
FIG. 3
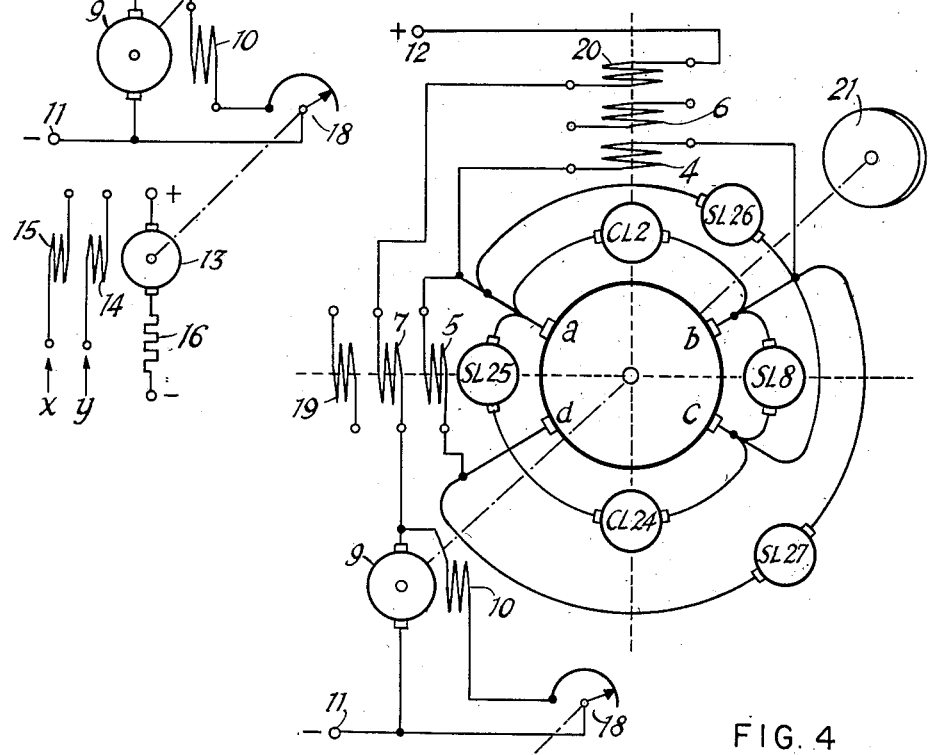
FIG. 4
INVENTOR
Joseph M. Pestarini
BY
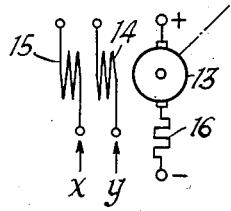
ATTORNEY Patented Apr. 1, 1952

2,590,887

UNITED STATES PATENT OFFICE 2,590,887

TRANSFORMER METADYNE

Joseph Maximus Pestarini, Staten Island, N. Y.

Application November 29, 1946, Serial No. 712,989

8 Claims. (Cl. 322—90)

The invention refers to an electric system comprising two groups of direct current machines and a direct current transformer of the metadyne type controlling the exchange of power between the two groups of machines.

An object of the invention is to provide an improved transformer metadyne controlling the transfer of power between two groups of electric machines by transforming the voltages and the currents supplied by one group of machines into voltages and currents appropriate to the other group of machines and cause said transfer of power to follow a predetermined condition of operation.

A system embodying the invention is particularly suitable when the operation of the two groups of machines is characterized by a periodic flow of energy from one group to the other.

Another object of the invention is to provide improved dynamo electric means interconnecting two groups of electrical machinery whereby the energy supplied by the machines of one of said groups during a phase of their periodic operation, is stored in the rotating masses of the second group and it is transferred to said one group of machines during another phase of said periodic operation.

A further object of the invention is to provide a transformer metadyne adapted to store energy in its rotating masses during one phase of the operation of said metadyne and to give up said energy during another phase of its operation.

The metadyne is an electric direct current machine having more than two brushes per cycle, the flux created by the current traversing the armature through a pair of brushes inducing an electromotive force between the brushes of another pair of the same cycle. The number of cycles of an electric machine is defined as the number of repetitions of the disposal of all electric and mechanical parts of the machine as seen by an observer accomplishing a complete circumference of the air gap.

The metadyne has been described in many United States Patents of the same applicant, see Patents Nos. 2,055,240; 1,987,417; 2,038,380; 2,049,389 and 2,079,465. A more complete description has been given in Revue Generale de l'Electricite, on March 8 and 15, August 16 and 23, November 22 and 29 and December 6, 1930, Paris.

The invention is herein described with the aid of several examples of application, reference being made to the accompanying drawings.

Figure 1 shows the connections of a transformer metadyne embodying the invention and controlling the flow of power between a dynamo and a motor metadyne; Figure 2 shows the connections of a transformer metadyne embodying the invention and controlling the flow of power between two groups of electrical machines; Figure 3 shows the connection of a transformer metadyne embodying the invention controlling the flow of power between a single electrical machine and a group comprising a plurality of electrical machines; Figure 4 shows the connections of a transformer metadyne embodying the invention, controlling the flow of power between a group comprising two electrical machines and another group comprising three electrical machines; Figure 5 shows the connections of a transformer metadyne embodying the invention, provided with six brushes per cycle and controlling the flow of power between a group of two electrical machines and another group of electrical machines.

In Figure 1, there is shown a metadyne 1, having four equidistant brushes per cycle, a, b, c and d. The primary brushes a and c are connected to a resistor 8 and the secondary brushes b and d are connected to a dynamo 2 separately excited by its field winding 3. The resistor 8 may be short circuited by the switch 17.

On the shaft of the metadyne 1, there is mounted a regulator dynamo 9 which is shunt excited through its field winding 10 and is connected to a direct current source at substantially constant voltage. The terminals of said current source are indicated at 11 and 12. The regulator dynamo is described in many United States patents of the same applicant, see United States Patent #1,962,030.

The critical speed of the shunt excited regulator dynamo 9 is modified by means of a variable resistor 18, connected in series with field winding 10. The resistance of said resistor is varied by means of an arm operated by a governor dynamo 13. The armature of the dynamo 13 is connected to a direct current source through a ballast resistor 16 for limiting the armature current to a predetermined value when the governor dynamo is at rest. The governor dynamo is provided with a pair of field windings 14, 15 traversed by the currents $x$ and $y$, respectively. The governor dynamo, 13, its operation, the manner in which it controls the operation of rheostat 18 and the manner in which its torque is controlled by its field winding 14, 15, is more fully described in application, Serial Number 712,630, filed November 27, 1946.

The metadyne 1 is provided with stator windings, 4, 5, 6, 7, 19 and 20; the stator windings 4, 6 and 20 have their magnetic axis along the commutating axis of the primary brushes $a$ and $c$ and the windings 5, 7 and 19 have their magnetic axis along the commutating axis of the secondary brushes $b$ and $d$. The stator winding 7 is traversed by the current supplied by the regulator dynamo 9 and it may be referred to as a regulator winding. The winding 6 is connected to an external source of current controlled by a rheostat 30. The windings 4 and 5 are shunt connected across the metadyne brushes $b$, $d$ and $a$, $c$ respectively. The winding 6 is referred to as a primary winding.

If it is desired that no transfer of power from the dynamo 2 to the resistor 8, shall take place, the armature current must be substantially nil, the losses being neglected. This is obtained by reducing to zero the current in the primary variator winding 6.

If transfer of power from dynamo 2 to resistor 8 is desired, then let a current other than zero be supplied to the primary variator winding 6. A corresponding current $I_a$ will traverse the primary brushes and the resistor 8, and will be substantially constant if the current of the variator winding 6 is also kept constant. With R, the resistance of the resistor 8, a Joule effect $RI_a^2$ will result, the power being supplied by the metadyne which will tend to decelerate coincidentally with regulator dynamo 9, causing thus a regulator current to traverse the regulator winding 7 and therefore causing a secondary current $I_b$, to traverse the dynamo 2.

If then the currents $x$ and $y$ of the governor dynamo 13 are reduced to zero, the speed of the metadyne 1 will be kept substantially constant and the dynamo 2 will operate with a constant output irrespective of its speed and the electromotive force induced in it.

If the variator winding 6 be shunt connected across the secondary brushes $b$ and $d$, the primary current is proportional to the secondary voltage and therefore the Joule effect in the resistor 8 is proportional to the square of the voltage induced in the dynamo 2. Consequently the current supplied by the dynamo 2 will be proportional to the voltage induced by the said dynamo.

If the current $y$ is set at a constant value, the current $x$ made proportional to the secondary current $I_b$ of the metadyne 1 and further if the current of the variator winding 6 is kept constant, the dynamo 2 will operate at constant current. The resistor 8 will absorb a constant power and the difference between the power supplied by the dynamo 2 and that absorbed by the resistor 8 will be absorbed or supplied by an adequate variation of the speed of the rotating masses of the metadyne.

In another case if the current $y$ is set at a constant value, the current $x$ made proportional to the secondary current $I_b$ of the metadyne 1, and further if the variator winding 6 is shunt connected across the secondary brushes, the dynamo 2 will operate at constant current and the supplied energy will be subdivided and partly transferred to the resistor 8 which will absorb a power proportional to the square of the voltage of the dynamo 2; and the rest of the power will be absorbed or supplied by a variation in the speed of the transformer metadyne.

If it is desired to transfer power from the dynamo 2 to the rotating masses of the metadyne 1 exclusively, the resistor 8 must be short circuited by the switch 17.

Other conditions of operation for the transfer of power may be obtained in a similar way, following the same procedure as indicated above, and as indicated in detail in the application, Serial Number 712,630.

It may be noted that the examples of operation herein described above are intended to cause the dynamo 2 to operate in accordance with a desired condition of operation and to cause the resistor 8 and the rotating masses of the metadyne to absorb the power that the dynamo 2 creates during said desired operation.

Note further that the current supplied by the dynamo 2 traversing the armature winding of the metadyne 1 creates a flux in the same direction as the commutating axis of the secondary brushes, $b$, $d$. Similarly, the current absorbed by the resistor 8 traversing the armature winding of the metadyne 1 creates a flux in the direction of the commutating axis of the brushes $a$ and $c$. The direction of said fluxes are disposed at 90 electrical degrees to each other. The operation is satisfactory only when said directions form with one another an electrical angle different from zero and preferably, 90 electrical degrees.

The winding 19 is supplied by a separate source of current with a current arbitrarily controlled by a rheostat 31 and the stator winding 20 is series connected with dynamo 9.

Assume that the currents $x$ and $y$ are reduced to zero and that the current traversing the variator winding 19 is constant, the secondary current $I_b$ traversing the dynamo 2 will be constant and the regulator current traversing the winding 20 will cause the primary current traversing the resistor 8 to create in that resistor a Joule effect equal to the output of the dynamo 2, the losses in the machines being neglected.

Assume now that the current $y$ is given a constant value and the current $x$ is made proportional to the primary current of the metadyne, then the output of the dynamo 2 will be transferred partly to the resistor 8 which will absorb a constant value of power and the remaining power will be transferred to the rotating masses of the metadyne.

Notice that the flux due to current of the dynamo 2 traversing the metadyne 1 is shifted at 90 electrical degrees relative to the flux due to the current of the resistor 8 traversing the metadyne 1.

An additional winding 7 is connected in series with the winding 20, traversed by the current supplied by the regulator dynamo 9, and primary variator winding 6, to further modify the operational characteristics of the system. The metadyne 1 is also provided with a flywheel 21 for increasing the total amount of kinetic energy that the rotating masses of the metadyne can store.

The magnetic axis of the regulator winding of the metadyne may be given a predetermined direction by modifying the ratio of the number of turns of the two said windings 7 and 20, since the windings, 7 and 20, have their magnetic axis along the commutating axis of the secondary and primary brushes, respectively.

The variator windings 19 and 6 may be suitably adjusted relative to each other to obtain a direction of the resultant ampere turns in the same manner.

It may be noted that the magnetic axis of the flux created by the resultant ampere turns of the regulator windings of the metadyne and the magnetic axis of the flux created by the resultant ampere turns of the variator windings must not coincide lest the regulator current neutralizes the effect of the ampere turns of the variator windings. The action of the ampere turns of the regulator windings may be considered as a reaction to the ampere turns of the variator windings and it may be shown that this reaction is at a maximum when the magnetic axis of the flux created by the regulator windings is at 90 electrical degrees with respect to the magnetic axis of the flux created by the variator windings. This may be obtained by an adequate ratio of the turns of the windings 6, 19 and 7, 20.

It is understood that the resistor 8, shown in Figure 1, may be replaced by other electrical devices. For example, a metadyne 22 and a dynamo 23 may be used in lieu of the resistor 8. The metadyne 22 may be connected to the primary brushes $a$ and $c$ of the transformer metadyne 1 through a switch 32 and similarly the dynamo 23 may be connected to the same brushes through a switch 33. The metadyne 22 and dynamo 23 may be placed in circuit simultaneously, and thus share the current delivered by the primary brushes of the transformer metadyne 1, upon closing switch 17 to short circuit resistor 8.

Figures 2 and 4 show schemes embodying the invention with a transformer metadyne having four brushes per cycle.

In Figure 2, the four brushes $a, b, c, d$ of the transformer metadyne 1 are not equidistant, but they are located symmetrically to the vertical and the horizontal axes. Between the brushes $a$ and $b$ an electrical machine of one group, such as a dynamo is inserted, being indicated by the symbol CL2. Between the brushes $c$ and $d$ another electrical machine of the same group is inserted being indicated by the symbol CL24. Between the brushes $b$ and $c$, and $a$ and $d$, respectively, the electrical machines SL8 and SL25 are inserted. All other elements of the scheme of Figure 2 are identical to the corresponding elements of the scheme of Figure 1.

It is to be understood that the machines CL2 and CL24 belong to one group, have similar operational characteristics during their simultaneous operation. Also machines SL8 and SL25 belong to the other group, have similar operational characteristics during their simultaneous operation. However, the operational characteristics of the machines of the one group are distinctly different from those of the devices of the other group and generally the operational characteristics of the two groups are complementary. For example, while the machines of one group deliver power, the devices of the other group absorb the power.

Assuming the winding pitch of the metadyne 1 to be diametrical, it is easily shown that the currents supplied by the machines CL2 and CL24 when they traverse the armature of the transformer metadyne 1, create a flux having the direction of the horizontal dotted line on the figure, and that the currents absorbed by the machines SL8 and SL25 when they traverse the armature of the transformer metadyne 1, create a flux having the direction of the vertical dotted line shown in the figure. Therefore, whatever has been said regarding the operation of the dynamo 2 of Figure 1, may be repeated here for the machines CL2 and CL24 of Figure 2, taking into account the equivalence between the current traversing the dynamo 2 of Figure 1 and the sum of the currents traversing the circuits of machines CL2 and CL24 of Figure 2. And whatever has been said about the resistor 8 of Figure 1 may be repeated here for the machines SL8 and SL25 of Figure 2, taking into account the equivalence between the current traversing the resistor 8 for the case of Figure 1, and the sum of the currents traversing the machine SL8 and the machine SL25 of Figure 2.

The flux created by the currents of the machines SL2 and CL24 traversing the armature of the transformer metadyne 1, is directed along the horizontal dotted line, an axis of symmetry of the brushes.

The flux created by the currents of the machines, SL8 and SL25 traversing the armature of the transformer metadyne 1, is directed along the vertical dotted line, another axis of symmetry of the brushes.

Figure 4 shows a scheme somewhat similar to that of Figure 2 and comprises in addition two further machines SL26 and SL27. The machine SL26 is connected between the brushes $a$ and $c$ and the machine SL27 is connected between the brushes $b$ and $d$. Both of these machines are in the same group as machines SL8 and SL25.

Figure 3 shows the arrangement of a transformer metadyne 1, having three equidistant brushes per cycle $a, b,$ and $c$. A group of two machines CL2 and CL24 are connected between the brushes $a$ and $c$ and between brushes $b$ and $c$ respectively. Another group is constituted by a single machine SL8 connected between brushes $a, b$. All other elements of the scheme of Figure 7 are similar to the corresponding elements of the scheme of Figure 1.

The flux created by the current of the machine SL8, traversing the armature of the transformer metadyne 1, is directed along the horizontal dotted line; the flux created by the currents supplied by the machines CL2 and CL24, taken as equal, traversing the armature of the transformer metadyne 1, is directed along the vertical dotted line.

Therefore, the operation of the arrangement of Figure 3 is similar to the operation of the arrangement of Figure 1, taking into account the equivalence of the action of the currents of the machines of the respective group.

Transformer metadynes are now considered which include more than four brushes per cycle and means are disclosed for connecting brushes of said transformer metadyne to the machines of the two groups, whereby said transformer metadyne controls the transfer of power from the machines of one group to the machines of the other group.

Heretofore, there has been considered metadynes with four or less brushes per cycle. The invention herein is also applicable to metadynes having more than four brushes per cycle. The rule is hereinafter disclosed for connecting the brushes of such metadynes to electrical machines of the two groups so that one may obtain operational characteristics for the transfer of power from machines of one group to machines of the other group, similar to the operational characteristics of the previously considered systems.

The consecutive brushes of a metadyne may be indicated by the letters of the alphabet in their normal sequence. Starting with any brush, for example, the brush $c$, determine the brush of the rank $c+k$ where $k$ is an arbitrary integer and connect the so selected brushes to an electric machine. Starting again from brush of the rank $c+h$, where $h$ is another arbitrary integer, determine the brush of the rank $c+h+k$ and connect the so selected brushes to another electric machine. Starting again from the brush of the rank $c+2h$, select the brush of the rank $c+2h+k$ and connect the so selected machine and so on.

This method of interconnection results in what may be designated as a Rosacean metadyne.

The rule disclosed above for providing a Rosacean metadyne, may be applied in respect to the same metadyne more than once, giving to the integers $c$, $h$ and $k$ various values.

Figure 5 illustrates a Rosacean metadyne having six brushes per cycle.

The stated rule applies for Figure 5 when $h=1$ and $k=2$.

The currents supplied by the machines of one group traverse the armature winding of the transformer metadyne and create a flux having a definite direction. In order to obtain said flux along an arbitrarily chosen diameter, one may connect the machines belonging to the same group to pairs of brushes of the metadyne transformer so chosen as to make the chord joining the brushes of a pair parallel to said chosen diameter, taking into account the electrical degrees between said diameter and said chord. For the same purpose one may connect the machines belonging to the same group to pairs of brushes of the metadyne transformer so chosen as to make the chords of said two pairs of brushes symmetrically arranged with respect to said chosen diameter, taking into account the electrical degrees between said diameter and said chords.

According to the invention the direction of the flux due to the currents of the machines of one group and the direction of the flux due to currents of the machines of the other group must form an electric angle greater than zero and preferably an angle of 90 electrical degrees.

In Figure 5 the last mentioned condition is fulfilled and the direction of said fluxes is indicated by dotted lines perpendicular to one another.

In Figure 5 there are two machines of one group, CL2 and CL24 and four machines of the other group, SL8, SL25, SL26 and SL27. The direction of the flux due to the currents of one group is along the vertical dotted line whatever may be the intensity of said currents. The direction of the flux due to the currents of the other group is along the horizontal dotted line provided the current of SL8 is equal to the current of SL26 and the current of SL25 is equal to the current of SL27. If said currents are not equal the direction of the corresponding flux will slightly deviate from said horizontal dotted line.

In Figure 9, the stator windings of the transformer metadyne has been shown as in Figure 3, the same numerals indicated the corresponding elements. For the sake of simplicity, the regulator dynamo and the governor dynamo have been omitted.

The stator windings of the metadyne of the invention may be energized by amplifier metadynes, not shown, each of the latter energizing all stator windings at 180 electrical degrees, with a current creating in the said windings ampere turns having the same direction and the same value as the resultant ampere turns of the corresponding stator windings as shown in any of the preceding figures.

It is thus apparent that an improved transformer metadyne is disclosed provided with special connections to electrical machines between which a transfer of power occurs, provided further with a plurality of stator windings, at least one of which is connected to a speed regulator dynamo and other windings energized with an arbitrarily controlled current, said metadyne being further provided with a device for varying continuously and automatically its operating speed. It is further apparent that arrangements are disclosed for the location and for the connections of said stator windings, whereby the transfer of electric power between the machines is controlled and caused to follow an arbitrarily defined law, said power transfer being complemented with a transformation of energy from the electrical form to the mechanical form, said energy being stored in the rotating masses of said transformer metadyne.

As various possible embodiments might be made of the above described invention, and as various changes might be made in embodiments set forth, it is to be understood that all matters herein set forth or shown in the accompanying drawings, is to be interpreted as illustrative and not in a limited sense.

What I claim is:

1. An electric power system including a transformer metadyne comprising an armature with a plurality of brushes associated therewith and a plurality of stator windings, a first rotating electrical machine connected to a selected pair of said brushes, a second rotating electrical machine connected to a selected pair of said brushes, means for controlling the operational speed of said metadyne comprising a regulator dynamo in circuit with one of said stator windings, a variable resistance in circuit with the field winding of said regulator dynamo and dynamo means for varying said resistance, said brushes being displaced relative to each other whereby the currents of said first electrical machine traversing the armature of said metadyne create a flux forming with the flux created by the currents of said second electrical machine traversing the armature of said metadyne, an angle of substantially 90 electrical degrees, thereby allowing the transfer of power between said first and second electrical machines.

2. An electric power system as in claim 1 and further including a resistor in shunt relation to said second electrical machine and switch means for selectively connecting said second mentioned pair of brushes to said second electrical machine or said resistor.

3. An electric power system as in claim 1, wherein said metadyne comprises four equiangularly located brushes, the brushes in each of said selected pairs of brushes being opposed to each other.

4. An electric power system as in claim 1, wherein said pairs of brushes include a common brush.

5. An electric power system as in claim 1, wherein a second of said stator windings is in shunt relation to one of said pairs of brushes, a third stator winding is in shunt relation with the other of said pairs of brushes, and a fourth stator winding is adapted to be independently energized.

6. An electric power system as in claim 1, wherein said pairs of brushes include a common brush and further including a third rotating electrical machine connected to the brushes other than the common brush.

7. An electric power system as in claim 1, wherein a second stator winding is connected in series with said first mentioned stator windings, said windings being located relative to each other and having a ratio of turns whereby the fluxes created by the respective windings have an electrical angle of substantially 90°.

8. An electric power system including a transformer metadyne comprising an armature with a plurality of associated brushes and a plurality of stator windings, a group of rotating electrical machines, a second group of rotating electrical machines, each of said machines being connected to a selected pair of brushes, the brushes being angularly displaced relative to each other whereby chords extending between selected pairs of brushes connected to machines of one group are parallel to each other and chords extending between selected pairs of brushes connected to machines of the other group are parallel to each other, means for controlling the operational speed of said metadyne comprising a regulator dynamo in circuit with one of said stator windings, and means for varying the resistance of the excitation circuit of said regulator dynamo, the disposition of said brushes being such that the fluxes created by the currents of the respective groups of machines traversing the armature of said metadyne forming an electrical angle of substantially 90° thereby permitting the transfer of power between said groups of machines.

JOSEPH MAXIMUS PESTARINI.

No references cited.